(12) United States Patent
Ichiki

(10) Patent No.: US 8,582,653 B2
(45) Date of Patent: Nov. 12, 2013

(54) CODING APPARATUS AND CODING METHOD

(75) Inventor: Atsushi Ichiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 595 days.

(21) Appl. No.: 12/551,983

(22) Filed: Sep. 1, 2009

(65) Prior Publication Data

US 2010/0061462 A1 Mar. 11, 2010

(30) Foreign Application Priority Data

Sep. 9, 2008 (JP) ................................ 2008-230958

(51) Int. Cl.
*H04N 7/32* (2006.01)
*H04N 11/02* (2006.01)

(52) U.S. Cl.
USPC .............. 375/240.16; 375/240.12; 375/240.24

(58) Field of Classification Search
USPC ........................................ 375/240.16, 240.24
See application file for complete search history.

(56) References Cited

U.S. PATENT DOCUMENTS

| | | | |
|---|---|---|---|
| 4,779,131 A | 10/1988 | Matsumoto et al. | |
| 5,706,059 A * | 1/1998 | Ran et al. | 348/699 |
| 6,108,040 A * | 8/2000 | Moteki et al. | 375/240.16 |
| 6,222,883 B1 * | 4/2001 | Murdock et al. | 375/240.16 |
| 6,430,316 B1 * | 8/2002 | Wilkinson | 382/236 |
| 6,430,317 B1 * | 8/2002 | Krishnamurthy et al. | 382/236 |
| 6,714,591 B1 * | 3/2004 | Katata et al. | 375/240.08 |
| 6,754,269 B1 * | 6/2004 | Yamaguchi et al. | 375/240.1 |
| 6,823,013 B1 * | 11/2004 | Boice et al. | 375/240.17 |
| 2001/0019631 A1 * | 9/2001 | Ohsawa et al. | 382/242 |
| 2003/0112867 A1 * | 6/2003 | Hannuksela et al. | 375/240.08 |
| 2005/0100230 A1 * | 5/2005 | Moore | 382/232 |
| 2005/0259737 A1 * | 11/2005 | Chou et al. | 375/240.16 |
| 2006/0018383 A1 * | 1/2006 | Shi et al. | 375/240.16 |
| 2006/0153472 A1 * | 7/2006 | Sakata et al. | 382/255 |
| 2008/0025398 A1 * | 1/2008 | Molloy et al. | 375/240.16 |
| 2008/0225948 A1 * | 9/2008 | Lin et al. | 375/240.12 |
| 2008/0247465 A1 * | 10/2008 | Xin et al. | 375/240.16 |
| 2009/0028245 A1 * | 1/2009 | Vieron et al. | 375/240.16 |
| 2009/0097566 A1 * | 4/2009 | Huang et al. | 375/240.24 |
| 2009/0135909 A1 * | 5/2009 | Chen et al. | 375/240.16 |

FOREIGN PATENT DOCUMENTS

JP 62-025588 2/1987

* cited by examiner

*Primary Examiner* — Joseph Ustaris
*Assistant Examiner* — On S Mung
(74) *Attorney, Agent, or Firm* — Staas & Halsey LLP

(57) ABSTRACT

A coding apparatus includes a window information acquiring unit acquiring window information indicating an arrangement of windows on a screen that includes a plurality of windows, an identifying unit identifying macroblocks that include a border between overlapping windows from the window information and macroblock information indicating an arrangement of macroblocks into which the screen is partitioned, a classifying unit partitioning the identified macroblocks into sub-blocks so as to conform to the border and classifying the sub-blocks into which the macroblocks are partitioned into groups, and a coding unit coding the sub-blocks classified into the groups by applying the result of the motion vector prediction to the other sub-blocks classified in the same group.

8 Claims, 13 Drawing Sheets

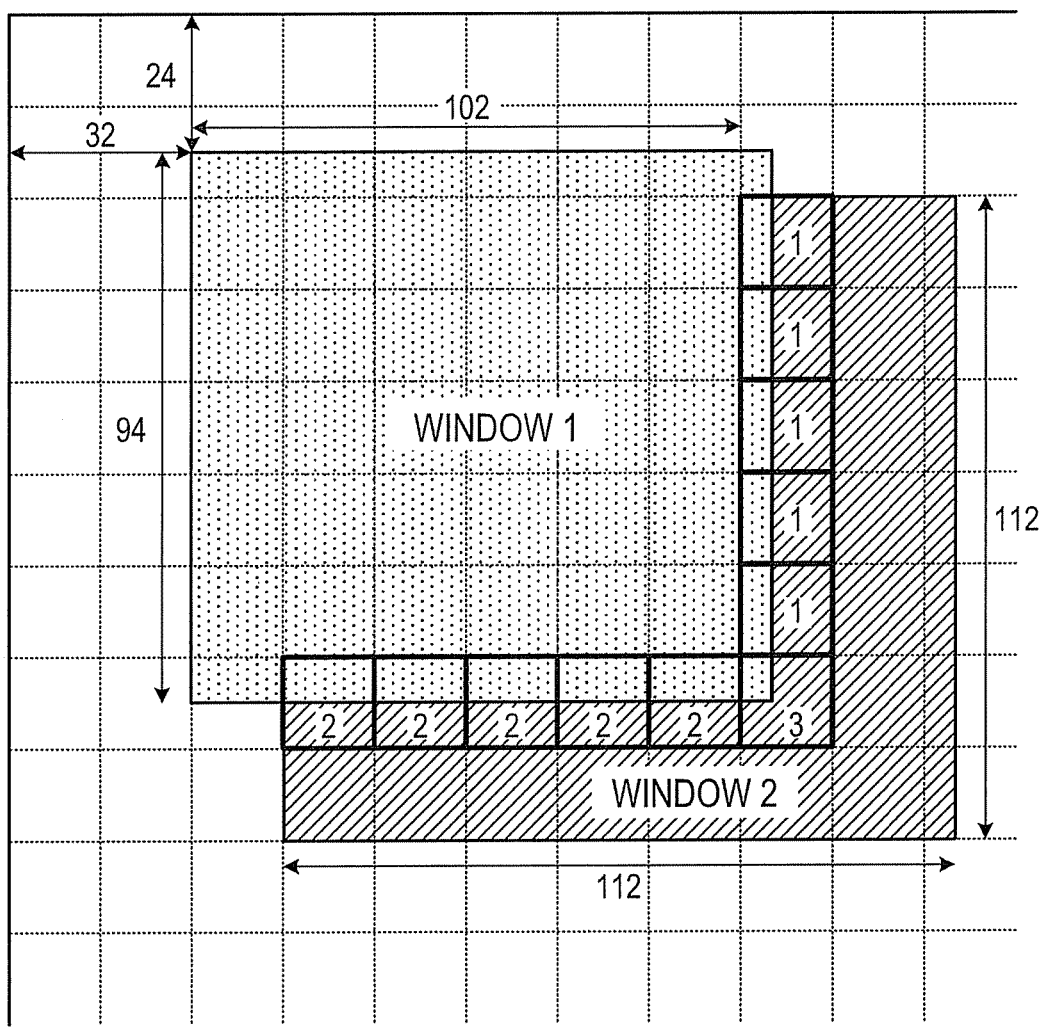

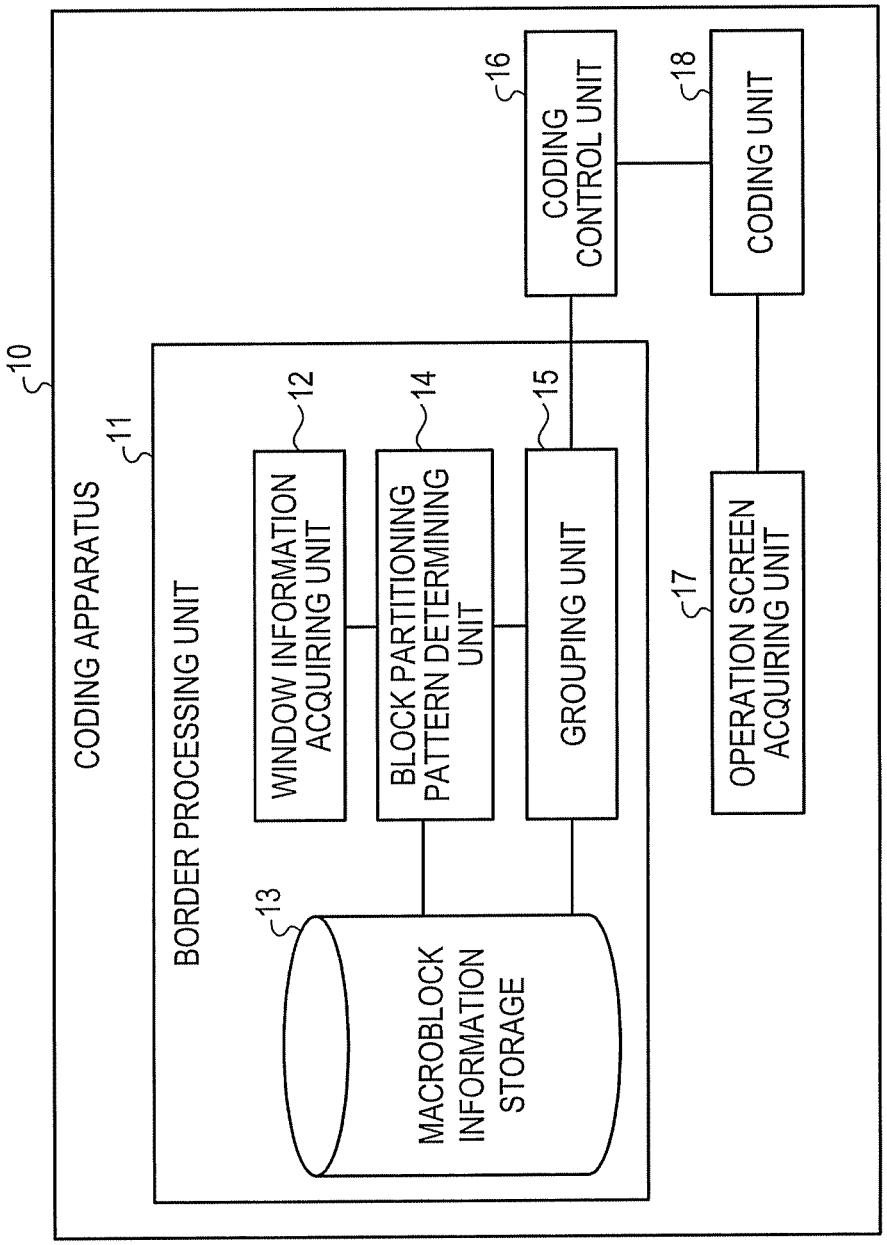

FIG. 3A

| WINDOW 1 |
|---|
| Window_No=1
Position_H=24
Position_W=32
Height=94
Width=102
Layer_No=1
Layer_Base=0 |

FIG. 3B

| WINDOW 2 |
|---|
| Window_No=2
Position_H=32
Position_W=56
Height=112
Width=112
Layer_No=2
Layer_Base=1 |

FIG. 4

| MACROBLOCK NUMBER | Position_H | Position_W | BORDER | BLOCK PARTITIONING PATTERN |
|---|---|---|---|---|
| 1 | 0 | 0 | | |
| 2 | 0 | 16 | | |
| 3 | 0 | 32 | | |
| 4 | 0 | 48 | | |
| ⋮ | ⋮ | ⋮ | ⋮ | ⋮ |
| 120 | 16 | 0 | | |
| 121 | 16 | 16 | | |
| 122 | 16 | 32 | | |
| 123 | 16 | 48 | | |
| ⋮ | ⋮ | ⋮ | ⋮ | ⋮ |
| 247 | 16 | 128 | ○ | 1 |
| ⋮ | ⋮ | ⋮ | ⋮ | ⋮ |
| 840 | 112 | 0 | | |
| 841 | 112 | 16 | | |
| 842 | 112 | 32 | | |
| 843 | 112 | 48 | ○ | 2 |
| 844 | 112 | 64 | ○ | 2 |
| 845 | 112 | 80 | ○ | 2 |
| 846 | 112 | 96 | ○ | 2 |
| 847 | 112 | 112 | ○ | 2 |
| 848 | 112 | 128 | ○ | 3 |
| ⋮ | ⋮ | ⋮ | ⋮ | ⋮ |

FIG. 8

Block_No1
Group=1
ME_flag=1
Block_No2
Group=2
ME_flag=0
Block_No3
Group=2
ME_flag=0
Block_No4
Group=2
ME_flag=1

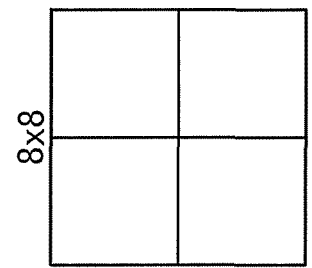
FIG. 12A 16x16  FIG. 12B 16x8  FIG. 12C 8x16  FIG. 12D 8x8
MB Type
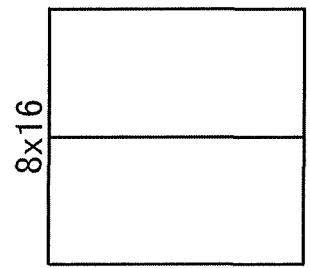
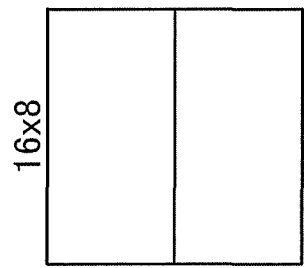
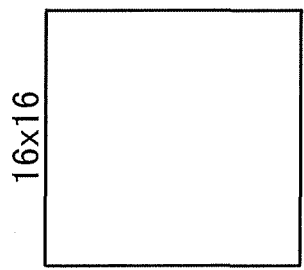
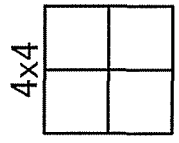
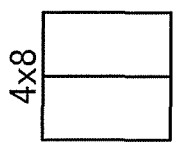
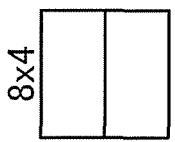
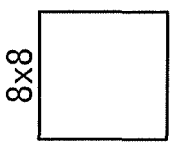
FIG. 12E 8x8  FIG. 12F 8x4  FIG. 12G 4x8  FIG. 12H 4x4
SubMB Type

CODING APPARATUS AND CODING METHOD

CROSS-REFERENCE TO RELATED APPLICATION(S)

This application is based upon and claims the benefit of priority of the prior Japanese Patent Application No. 2008-230958, filed on Sep. 9, 2008, the entire contents of which are incorporated herein by reference.

BACKGROUND

Various embodiments relate to a coding apparatus and a coding method.

DESCRIPTION OF THE RELATED ART

In a system in which a terminal on a network remotely controls another terminal on the network, like a VNC (Virtual Network Computing) used in a thin client system, operation screen images have been transmitted as a bitmap image on a network. In these days, however, operation screen images are encoded using video coding techniques such as H.264 in order to reduce bandwidth usage and are then transmitted.

When an operation screen image in which multiple windows overlap one another as shown in FIG. 11 is encoded, each macroblock at a border between the windows is partitioned into sub-macroblocks in an optimum partitioning pattern conforming to the border and motion vector prediction is performed on each sub-macroblock. H.264 includes various partitioning patterns in which a macroblock of 16×16 pixels is partitioned into sub-macroblocks. The smallest sub-macroblock is a block of 4×4 pixels.

If a corner of borders is included in a macroblock as shown in FIG. 13 for example, a coding apparatus tries all of the various partitioning patterns shown in FIGS. 12A-12H or combinations of them for the macroblock to determine an optimum partitioning pattern conforming to the borders, partitions the macroblock into sub-macroblocks in the optimum pattern, and performs motion vector prediction on each of the sub-macroblocks. FIG. 11 is a diagram illustrating a conventional art and FIGS. 12A-12H and 13 are diagrams illustrating macroblock partitioning.

The conventional art described above has a problem that a large amount of computation is involved because the coding apparatus tries various partitioning patterns (or combinations of them) for a border between windows to determine optimum partitioning patterns conforming to the border, partitions each macroblocks at the border into sub-macroblocks, and then performs motion vector prediction on each of the sub-macroblocks.

Japanese Patent Application Laid-Open No. 62-025588 discloses a technique in which motion vectors of an input image including a region overlapping an output image is corrected with motion vectors of an input image that does not overlap the output image. However, the technique does not solve the above problem in thin client systems.

The problem is not limited to coding with H.264. The same problem also arises in coding with H.261 and H.263 standardized by the ITU (International Telecommunication Union)-T (Telecommunication Standardization Sector) and MPEG (Moving Picture Experts Group)-1, -2, and -4 and AVC (Advanced Video Coding) standardized by the ISO (International Organization for Standardization).

Various embodiments described herein solve the problem with the related art described above and an object of the present invention is to provide a coding apparatus and a coding method capable of reducing the amount of computation.

SUMMARY

A coding apparatus includes a window information acquiring unit acquiring window information indicating an arrangement of windows on a screen including a plurality of windows, an identifying unit identifying a macroblock including a border between overlapping windows from the window information and macroblock information indicating an arrangement of macroblocks into which the screen is partitioned, a classifying unit partitioning the identified macroblock into blocks so as to conform to the border and classifying the blocks into which the macroblock is partitioned into groups based on whether or not the blocks include the border, and a coding unit coding the blocks classified into the groups by performing motion vector prediction using a certain block in a group for blocks classified as the same group and applying the result of the motion vector prediction to the other blocks classified as the same group.

A control method includes acquiring window information indicating an arrangement of windows on a screen that includes a plurality of windows, reading, from a storage device, macroblock information indicating an arrangement of macroblocks into which the screen is partitioned, identifying one or more macroblocks that include a border between overlapping windows based on the window information and the macroblock information, partitioning the identified one or more macroblocks that include the border between the overlapping windows into sub-blocks so as to conform to the border, classifying the plurality of sub-blocks into which the one or more macroblocks are partitioned into groups based on whether or not the sub-blocks include the border, and coding the classified sub-blocks by performing motion vector prediction using a certain sub-block in a group for sub-blocks classified in the same group and applying a result of the motion vector prediction of the certain sub-block to the other sub-blocks classified in the same group as the certain sub-block.

BRIEF DESCRIPTION OF THE DRAWINGS

FIG. 1 is a diagram for providing an outline of a coding apparatus according to a first embodiment;

FIG. 2 is a block diagram illustrating a configuration of the coding apparatus according to the first embodiment;

FIGS. 3A-3B are diagram illustrating window information;

FIG. 4 is a diagram illustrating a micro block information storage;

FIG. 8 is a diagram illustrating grouping information;

FIGS. 12A-12H are diagram illustrating partitioning of a macroblock; and

DETAILED DESCRIPTION OF THE EMBODIMENTS

Figure 5:
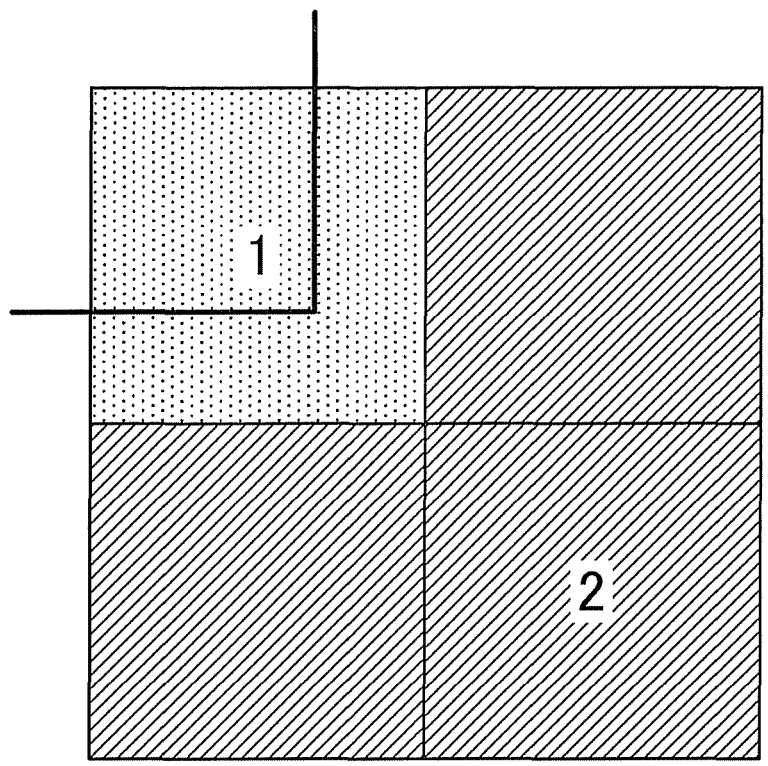
FIG. 5 is a diagram illustrating partitioning and grouping at a window border (a corner)

Embodiments of a coding apparatus and a coding method (program) according to the present invention will be described below in detail with reference to the accompanying drawings. An outline of a coding apparatus according to a first embodiment will be provided first and then a configuration, process procedure, and advantages of the coding apparatus will be described.

[First Embodiment]

[Outline of a Coding Apparatus According to the First Embodiment]

An outline of a coding apparatus according to the first embodiment will be described first with reference to FIG. 1. FIG. 1 is a diagram for providing an outline of the coding apparatus according to the first embodiment. H.264 is used as the video coding scheme in the first embodiment.

The coding apparatus according to the first embodiment acquires window information indicating the arrangement of windows on an operation screen including multiple windows. For example, when there are windows 1 and 2 on the operation screen as shown in FIG. 1, the coding apparatus acquires window information about windows 1 and 2.

For example, window information about window 1 includes information such as a vertical position of "24" represented by the distance from the upper edge of the operation screen to the upper left corner of window 1, a horizontal position "32" represented by the distance from the left edge of the operation screen to the upper left corner of window 1, the vertical size "94" and the horizontal size "102" of window 1. The window information also includes information about overlapping, such as information indicating that window 1 is in the foreground.

The coding apparatus according to the first embodiment then identifies macroblocks including a border between the overlapping windows from the acquired window information and macroblock information that indicates the arrangement of macroblocks of 16×16 pixels into which the operation screen is partitioned. For example, the coding apparatus partitions the operation screen into macroblocks, starting from the upper left corner of the operation screen, as shown in FIG. 1, when coding the operation screen. Consequently, the coding apparatus has stored macroblock information indicating the arrangement of the macroblocks. Accordingly, the coding apparatus identifies macroblocks including a border from the window information and the macroblock information.

For example, the coding apparatus identifies macroblocks enclosed in heavy lines as shown in FIG. 1 as the macroblocks on the borders between the overlapping windows 1 and 2.

Then, the coding apparatus according to the first embodiment determines from the window information and the macroblock information a partitioning pattern for partitioning each of the identified macroblocks so as to conform to the border.

For example, the coding apparatus determines to use partitioning pattern "1" for partitioning the macroblocks including the right border among the macroblocks it identified as the macroblocks on the borders. In partitioning pattern "1", a macroblock is partitioned into two sub-macroblocks of 8×16 pixels as shown in FIG. 12C.

The coding apparatus determines to use partitioning pattern "2" for the macroblocks including the bottom border and partitioning pattern "3" for the macroblock including the corner of borders. In partitioning pattern "2", a macroblock is partitioned into two 16×8 sub-macroblocks as shown in FIG. 12B. In partitioning pattern "3", a macroblock is partitioned into four 8×8 sub-macroblocks as shown in FIG. 12D.

The coding apparatus partitions each macroblock on the borders between the windows for which the coding apparatus has determined a partitioning pattern into sub-macroblocks according to the determined partitioning pattern and performs motion vector prediction on each of the sub-macroblocks.

That is, the coding apparatus partitions each macroblock including the right border into two 8×16 sub-macroblocks and then performs motion vector prediction on each sub-macroblock. The coding apparatus partitions each macroblock including the bottom border into two 16×8 sub-macroblocks and the macroblock including the corner of borders into four 8×8 sub-macroblocks. The coding apparatus performs motion vector prediction on each of the sub-macroblocks.

As will be described later, when the coding apparatus according to the first embodiment encodes the sub-macroblocks, the coding apparatus duplicates the result of motion vector prediction from one sub-macroblock to the other sub-macroblock(s) classified as the same group.

As has been described, the coding apparatus according to the first embodiment determines an optimum partitioning pattern conforming to a border between windows by using the window information and the macroblock information, rather than trying all of various partitioning patterns for the border. Therefore, the amount of computation involved in the process for determining partitioning patterns can be reduced according to the first embodiment.

The coding apparatus according to the first embodiment duplicates the result of motion vector prediction from one sub-macroblock to the other(s) in the same group. Accordingly, the amount of computation involved in the motion vector prediction processing can be reduced.

[Configuration of the Coding Apparatus According to the First Embodiment]

A configuration of the coding apparatus according to the first embodiment will be described with reference to FIGS. 2 to 8. FIG. 2 is a block diagram showing a configuration of the coding apparatus according to the first embodiment.

As shown in FIG. 2, the coding apparatus 10 according to the first embodiment includes a border processing unit 11, a coding control unit 16, an operation screen acquiring unit 17, and a coding unit 18.

The border processing unit 11 acquires window information and determines a partitioning pattern for a macroblock and grouping of macroblocks. In particular, the border processing unit 11 includes a window information acquiring unit 12, a macroblock information storage 13, a block partitioning pattern determining unit 14, and a grouping unit 15.

The window information acquiring unit 12 acquires window information indicating the arrangement of windows on an operation screen that includes multiple windows. In particular, the window information acquiring unit 12 is connected to the block partitioning pattern determining unit 14, acquires window information collected in a graphic board or the like for drawing the operation screen and provides the acquired window information to the block partitioning pattern determining unit 14.

For example, the window information acquiring unit 12 acquires window information as shown in FIGS. 3A, 3B. FIGS. 3A, 3B illustrates window information. Here, "Window_No" is the number of a window on the operation screen, "Position_H" is a vertical position of the window represented by the distance from the upper edge of the operation screen to the upper left corner of the window, and "Position_W" is a horizontal position of the window represented by the distance from the left edge of the operation screen to the upper left corner of the window. "Height" is the vertical size of the window, "Width" is the horizontal size of the window, "Layer_No" indicates a layer of a window stack at which the window is and "Layer_Base" indicates a window behind which the window lies. "Layer_No" starts with "1". A window closer to the background has a higher layer number. In the example in FIG. 3, window 1 (FIG. 3A) is in the foreground and window 2 (FIG. 3B) is behind window 1.

The macroblock information storage 13 stores macroblock information indicating the arrangement of macroblocks into which the operation screen is partitioned. In particular, the macroblock information storage 13 is connected to the block partitioning pattern determining unit 14 and the grouping unit 15. The macroblock information stored in the macroblock information storage 13 is used in processing performed by the block partitioning pattern determining unit 14 and processing performed by the grouping unit 15.

For example, the macroblock information storage 13 stores macroblock information as shown in FIG. 4. FIG. 4 is a diagram for explaining the macroblock information storage. Here, "Macroblock number" is the number identifying each of the macroblocks into which the operation screen is partitioned. "Position_H" is a vertical position of the macroblock represented by the distance from the left edge of the operation screen to the upper left corner of the macroblock, "Position_W" is a horizontal position of the macroblock represented by the distance from the left edge of the operation screen to the upper left corner of the macroblock. The "Border" is information identifying a macroblock including a border between windows overlapping one another. In the example in FIG. 4, a circle indicates a macroblock identified as a macroblock including a border. The "Block partitioning pattern" indicates a block partitioning pattern determined.

"Macroblock number", "Position_H", and "Position_W" are information that does not change in principle. These items of information are input by a user beforehand and are stored in the macroblock information storage 13. On the other hand, "Border" and "Block partitioning pattern" are information that can vary depending on operation screens. The "Border" and "Block partitioning pattern" information is provided by the block partitioning pattern determining unit 14 and stored in the macroblock information storage 13.

The block partitioning pattern determining unit 14 identifies macroblocks including a border between windows and determines a partitioning pattern in which each of the identified macroblocks is partitioned to conform to the border. In particular, the block partitioning pattern determining unit 14 is connected to the window information acquiring unit 12, the macroblock information storage 13, and the grouping unit 15.

The block partitioning pattern determining unit 14 uses window information acquired by the window information acquiring unit 12 and macroblock information stored in the macroblock information storage 13 to identify macroblocks including a border and determine a partitioning pattern. After the block partitioning pattern determining unit 14 identifies a macroblock including a border, the block partitioning pattern determining unit 14 stores the information about the identified macroblock in the macroblock information storage 13. After the block partitioning pattern determining unit 14 determines a partitioning pattern, the block partitioning pattern determining unit 14 stores the determined partitioning pattern in the macroblock information storage 13. The block partitioning pattern determining unit 14 notifies the grouping unit 15 of the completion of the identification of macroblocks and determination of partitioning patterns.

For example, the block partitioning pattern determining unit 14 identifies macroblocks including borders as shown in FIG. 1. That is, the block partitioning pattern determining unit 14 uses the window information in FIGS. 3A, 3B and the macroblock information in FIG. 4 to identify the macroblocks with macroblock numbers "247", "367", "487", "607", and "727" as macroblocks including the right border. The block partitioning pattern determining unit 14 identifies the macroblocks with macroblock number "843", "844", "845", "846" and "847" as macroblocks including the bottom border. The block partitioning pattern determining unit 14 also identifies the macroblock with macroblock number "848" as a macroblock including the corner of the borders.

The block partitioning pattern determining unit 14 determines partitioning patterns for the identified macroblocks as shown in FIG. 1. That is, the block partitioning pattern determining unit 14 uses the window information in FIGS. 3A, 3B and the macroblock information in FIG. 4 to choose partitioning pattern "1" in which a macroblock is partitioned into two 8×16 sub-macroblocks for the macroblocks including the right border (the macroblocks with macroblock numbers "247", "367", "487", "607" and "727"). For the macroblocks including the bottom border (the macroblocks with macroblock numbers "843", "844", "845", "846" and "847"), the block partitioning pattern determining unit 14 chooses partitioning pattern "2" in which a macroblock is partitioned into two 16×8 sub-macroblocks. For the macroblock including the corner of the borders (the macroblock with macroblock number "848"), the macroblock partitioning pattern determining unit 14 chooses partitioning pattern "3" in which a macroblock is partitioned into four 8×8 blocks.

The grouping unit 15 partitions each macroblock including a border between windows into sub-macroblocks according to a partitioning pattern and groups the resulting sub-macroblocks based on whether the sub-macroblocks include the border. In particular, the grouping unit 15 is connected to the block partitioning pattern determining unit 14 and the macroblock information storage 13.

When the grouping unit 15 is notified of completion of identification of macroblocks and determination of partitioning patterns by the block partitioning pattern determining unit 14, the grouping unit 15 refers to the macroblock information storage 13 to generate group information. The grouping unit 15 provides the macroblock numbers of the macroblocks and partitioning patterns that are stored in the macroblock information storage 13 to the coding control unit 16 together with the generated group information.

Figure 6:
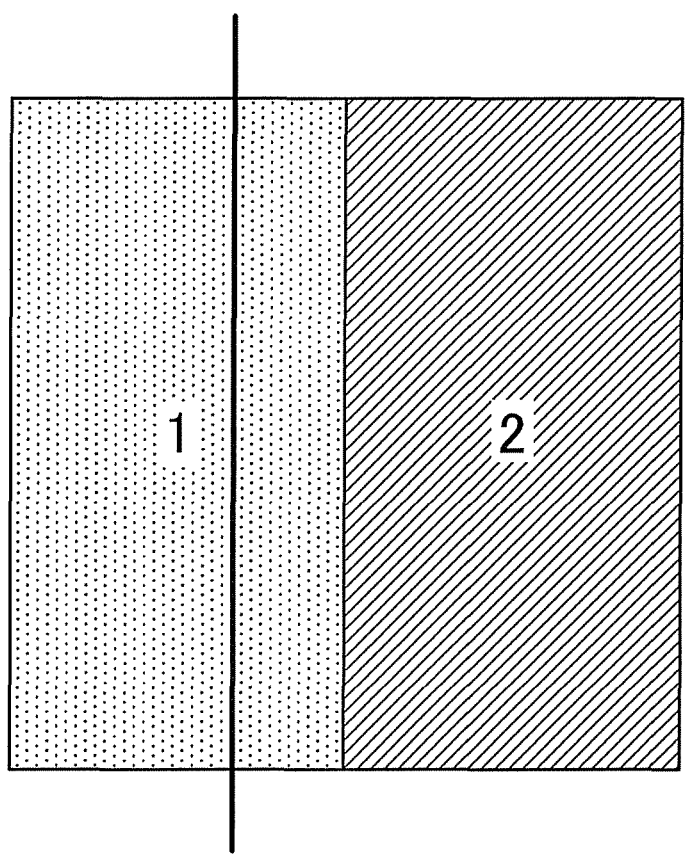
FIG. 6 is a diagram illustrating partitioning and grouping at a window border (the right border)
Figure 7:
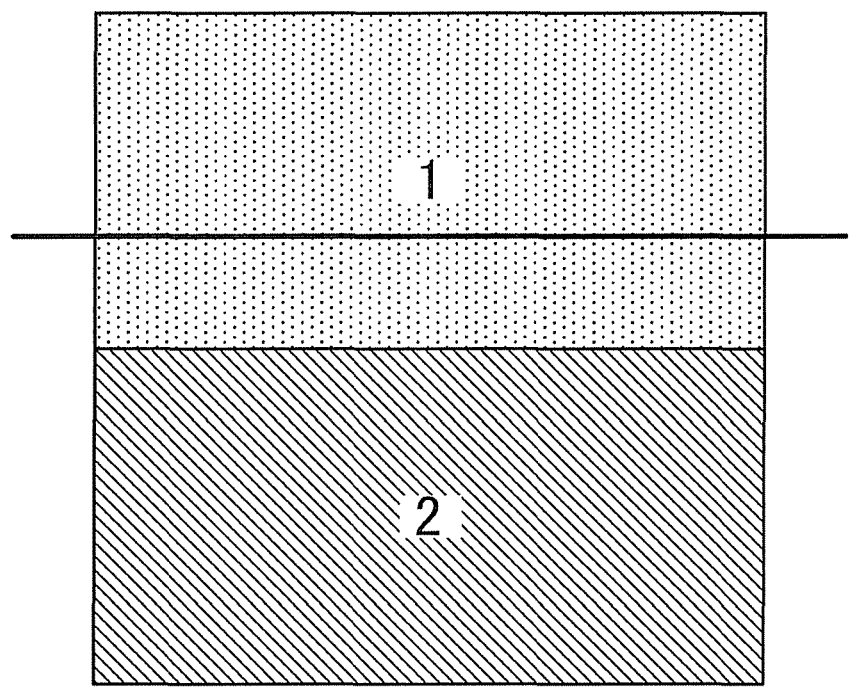
FIG. 7 is a diagram illustrating partitioning and grouping at a window border (the bottom border)

For example, the grouping unit 15 refers to macroblock information as shown in FIG. 4 to partition each macroblock including a border into sub-macroblocks according to a partitioning pattern and groups the sub-macroblocks based on whether the sub-macroblocks include the border as shown in FIGS. 5 to 7. FIG. 5 is a diagram for explaining block partitioning and grouping at a window border (a corner). FIG. 6 is a diagram illustrating block partitioning and grouping at a window border (the right border). FIG. 7 is a diagram illustrating block partitioning and grouping at a window border (the bottom border).

As shown in FIG. 5, the grouping unit 15 partitions a macroblock including a corner of borders into four 8×8 sub-macroblocks according to partitioning pattern "3". The grouping unit 15 then classified the upper-left sub-macroblock including the corner of the borders as group "1" and the other sub-macroblocks that do not include the corner as group "2". The grouping unit 15 partitions a macroblock including the right border into two 8×16 sub-macroblocks as shown in FIG. 6 according to partitioning pattern "1". The grouping unit 15 then classifies the left-hand sub-macroblock including the right border as group "1" and the right-hand sub-macroblock that does not include the right border as group "2". The grouping unit 15 partitions a macroblock including the bottom border into two 16×8 sub-macroblocks according to partitioning pattern "2" as shown in FIG. 7. The grouping unit 15 then classified the upper sub-macroblock that includes the bottom border as group "1" and the lower sub-macroblock that does not include the bottom border as group "2".

The grouping unit 15 generates group information as shown in FIG. 8, for example. FIG. 8 is a diagram illustrating group information. The group information shown in FIG. 8 is group information about a macroblock including the corner of borders as shown in FIG. 5. The macroblock including the corner of the borders was partitioned into four 8×8 sub-macroblocks, which were then classified into two groups: group "1" of the upper-left block including the corner of the borders and group "2" of the other blocks that do not include the corner of the borders. Accordingly, only the upper left block identified by "Block_No1" is indicated as "Group=1" and the other groups are indicated as "Group=2" in the group information as shown in FIG. 8.

Here, "ME_flag" is a flag indicating whether motion vector prediction is to be performed on the block. "ME_flag" is provided from the grouping unit 15 to the coding control unit 16 as part of group information and is used by the coding control unit 16 in coding control.

The coding control unit 16 controls coding according to group classification. In particular, the coding control unit 16 is connected to the grouping unit 15 and the coding unit 18. The coding control unit 16 uses macroblock numbers, partitioning patterns, and group information provided from the grouping unit 15 to control coding by the coding unit 18.

For example, the coding control unit 16 is provided with information such as macroblock number "848", partitioning pattern "3" and group information as shown in FIG. 8 from the grouping unit 15. Then, the coding control unit 16 controls the coding unit 18 to encode the macroblock identified by macroblock number "848" based on the group information shown in FIG. 8. That is, the coding control unit 16 controls the coding unit 18 to duplicate the result of motion vector prediction among the three blocks classified as "Group=2" blocks that do no include the border.

That is, the coding control unit 16 performs motion vector prediction only on the sub-macroblock "Block_No4" with "ME_flag=1" among the sub-macroblocks classified as "Group=2" that do not include the border. For the sub-macroblocks "Block_No2" and "Block_No3" with "ME_flag=0", the coding control unit 16 controls the coding unit 18 to duplicate the result of the motion vector prediction performed for sub-macroblock "Block_No4".

The operation screen acquiring unit 17 acquires operation screen information. In particular, the operation screen acquiring unit 17 is connected to the coding unit 18, acquires operation screen information collected in a graphic board or the like and sends the obtained operation screen information to the coding unit 18.

The coding unit 18 encodes the operation screen information. In particular, the coding unit 18 is connected to the coding control unit 16 and the operation screen acquiring unit 17 and encodes the operation screen information sent from the operation screen acquiring unit 17 under the control of the coding control unit 16.

[Process Procedure Performed by the Coding Apparatus According to the First Embodiment]

Figure 9:
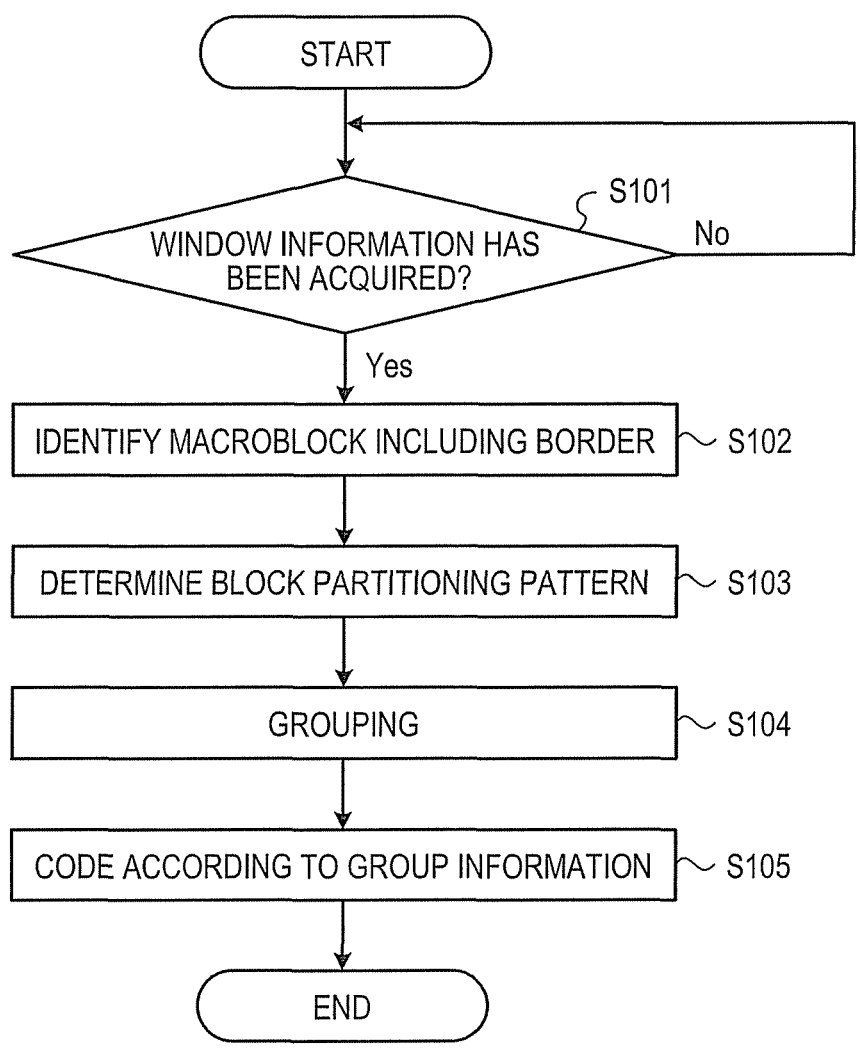
FIG. 9 is a flowchart of a process procedure performed in the coding apparatus according to the first embodiment.

A process procedure performed by the coding apparatus according to the first embodiment will be described with reference to FIG. 9. FIG. 9 is a flowchart illustrating a process procedure performed by the coding apparatus according to the first embodiment.

As shown in FIG. 9, determination is made as to whether the window information acquiring unit 12 has acquired window information (step S101). If acquired (determination at step S101 is affirmative), the acquired window information is provided to the block partitioning pattern determining unit 14.

Then, the block partitioning pattern determining unit 14 uses the window information provided from the window information acquiring unit 12 and macroblock information to identify a macroblock including a border between windows (step S102).

Then, the block partitioning pattern determining unit 14 uses the window information provided from the window information acquiring unit 12 and the macroblock information to determine a partitioning pattern that partitions the identified macroblock so as to conform to the border (step S103).

The grouping unit 15 refers to the macroblock information storage 13 to partition the macroblock including the border between the windows into sub-macroblocks according to the partitioning pattern and classifies the sub-macroblocks into groups based on whether the sub-macroblocks include the border (step S104). The grouping unit 15 generates group information and provides the group information to the coding control unit 16 together with other information.

Then, the coding control unit 16 uses the macroblock number, partitioning pattern, and group information provided from the grouping unit 15 to control coding by the coding unit 18 (step S105). That is, the coding control unit 16 controls the coding in such a manner that the result of motion vector prediction is duplicated from one sub-macroblock to the other (s) in the same group. Then, the coding apparatus 10 will end the process.

[Effects of the First Embodiment]

As has been described above, in the coding apparatus 10 according to the first embodiment, the window information acquiring unit 12 acquires window information indicating the arrangement of windows in an operation screen for multiple windows on the operation screen. The block partitioning pattern determining unit 14 identifies macroblocks including a border between the overlapping windows from the window information and macroblock information and determines a partitioning pattern in which each of the identified macroblocks is partitioned so as to conform to the border. The grouping unit 15 partitions each macroblock that includes the border into sub-macroblocks according to the partitioning pattern and classifies the resulting sub-macroblocks into groups based on whether the sub-macroblocks include the border. When the sub-macroblocks classified into groups are encoded, the coding control unit 16 uses a certain sub-macroblock among the sub-macroblocks in the same group to perform motion vector prediction and applies the result of the motion vector prediction to the other sub-macroblocks in the same group.

Figure 13:
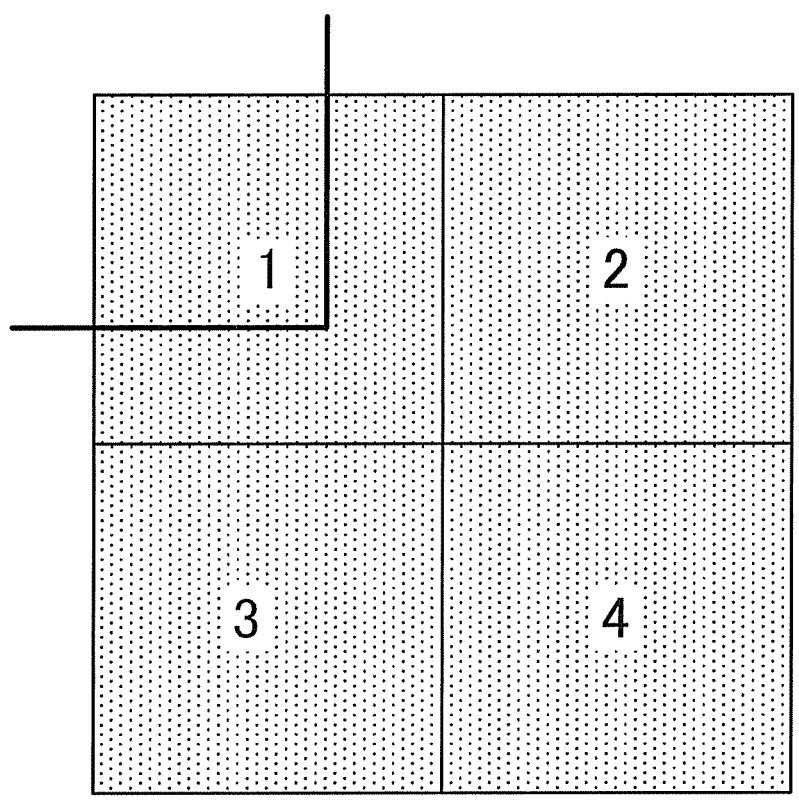
FIG. 13 is a diagram illustrating partitioning of a macroblock.

Consequently, the coding apparatus 10 according to the first embodiment can reduce the amount of computation. That is, since the coding apparatus 10 according to the first embodiment determines a partitioning pattern for macroblocks that include a border between windows without trying all partitioning patterns shown in FIGS. 12A-12H, the amount of computation involved in the partitioning pattern determination process can be reduced. Furthermore, the coding apparatus 10 according to the first embodiment can reduce the amount of computation involved in motion vector prediction processing by grouping sub-macroblocks into which a macroblock is partitioned. For example, if the borders shown in FIG. 13 are included in a macroblock, grouping as shown in FIG. 5 is performed, whereby the number of blocks for which motion vector prediction is to be performed can be reduced from four to two.

Furthermore, the coding apparatus 10 according to the first embodiment uses window information that includes at least the positions and sizes of windows and further includes information indicating whether an overlapping window is in the foreground or behind a window. Therefore, the coding apparatus 10 according to the first embodiment is capable of readily identifying a border between overlapping windows.

In the coding apparatus 10 according to the first embodiment, the grouping unit 15 uses window information to classify sub-macroblocks into which a macroblock is partitioned as either a group of blocks included in a foreground window or a group of blocks included in a window behind the window. Therefore, the coding apparatus 10 according to the first embodiment is capable of reducing the amount of computation involved in motion vector prediction processing.

In the coding apparatus 10 according to the first embodiment, the grouping unit 15 classifies sub-macroblocks so that a window indicated by window information as a foreground window includes the border. This is done because motion vectors are susceptible to the effect of an edge and the border moves together with the foreground window but the background window rarely moves. In this way, the coding apparatus 10 according to the first embodiment is capable of preventing degradation of image quality at borders.

In the coding apparatus 10 according to the first embodiment, the coding control unit 16 uses a certain sub-macroblock among the sub-macroblocks classified as the same group to perform motion vector prediction and applies the result of the motion vector prediction also to the other sub-macroblocks in the same group. Therefore, the coding apparatus 10 according to the first embodiment is capable of reducing the amount of computation involved in motion vector prediction processing.

[Alternative Embodiments]

The first embodiment of the present invention has been described. The present invention can be carried out in various other modes.

[Method in which ME_flag is Not Used]

In the first embodiment, a method has been described in which the grouping unit 15 generates "ME_flag" indicating whether motion vector prediction is to be performed or not when generating group information and provides the "ME_flag" to the coding control unit 16. The coding control unit 16 uses the "ME_flag" provided from the grouping unit 15 for duplicating the result of motion vector prediction in the first embodiment. However, the present invention is not limited to this.

For example, the grouping unit 15 does not need to provide "ME_flag" to the coding control unit 16. In that case, the coding control unit 16 may select any of the sub-macroblocks classified as the same group to perform motion vector prediction on the sub-macroblock and duplicate the result of the motion vector prediction to the other sub-macroblocks in the same group.

[Video Coding Schemes Other than H.264]

While the first embodiment has been described on the assumption that H.264 is used for coding a screen image, the present invention is not limited to H.264. The present invention is also applicable to coding that uses other video coding scheme such as H.261, H.263, MPEG-1, -2, or -4. The present invention is applicable to any video coding scheme that partitions macroblocks including a border between windows in coding a screen image.

[System Configurations]

All or part of the various kinds of processing described as being automatically performed in the present embodiments can be manually performed, or all or part of the processing described as being manually performed can be automatically performed with a known method. The process procedures described and depicted (such as the process procedure in FIG. 9), specific names, various kinds of data, and information including parameters can be modified at will unless otherwise stated.

The components of the apparatus shown represent functional concepts and do not necessarily need to be physically configured as shown (in figures such as FIG. 2). That is, specific forms such as distribution or integration of apparatuses are not limited to those shown. All or part of the apparatus can be functionally or physically distributed or integrated in any form depending on workloads and use. All or any part of processing and functions of each apparatus can be implemented by a CPU (Central Processing Unit) or by a program analyzed and executed by the CPU or implemented as hardware by wired logics.

[Coding Program]

Figure 10:
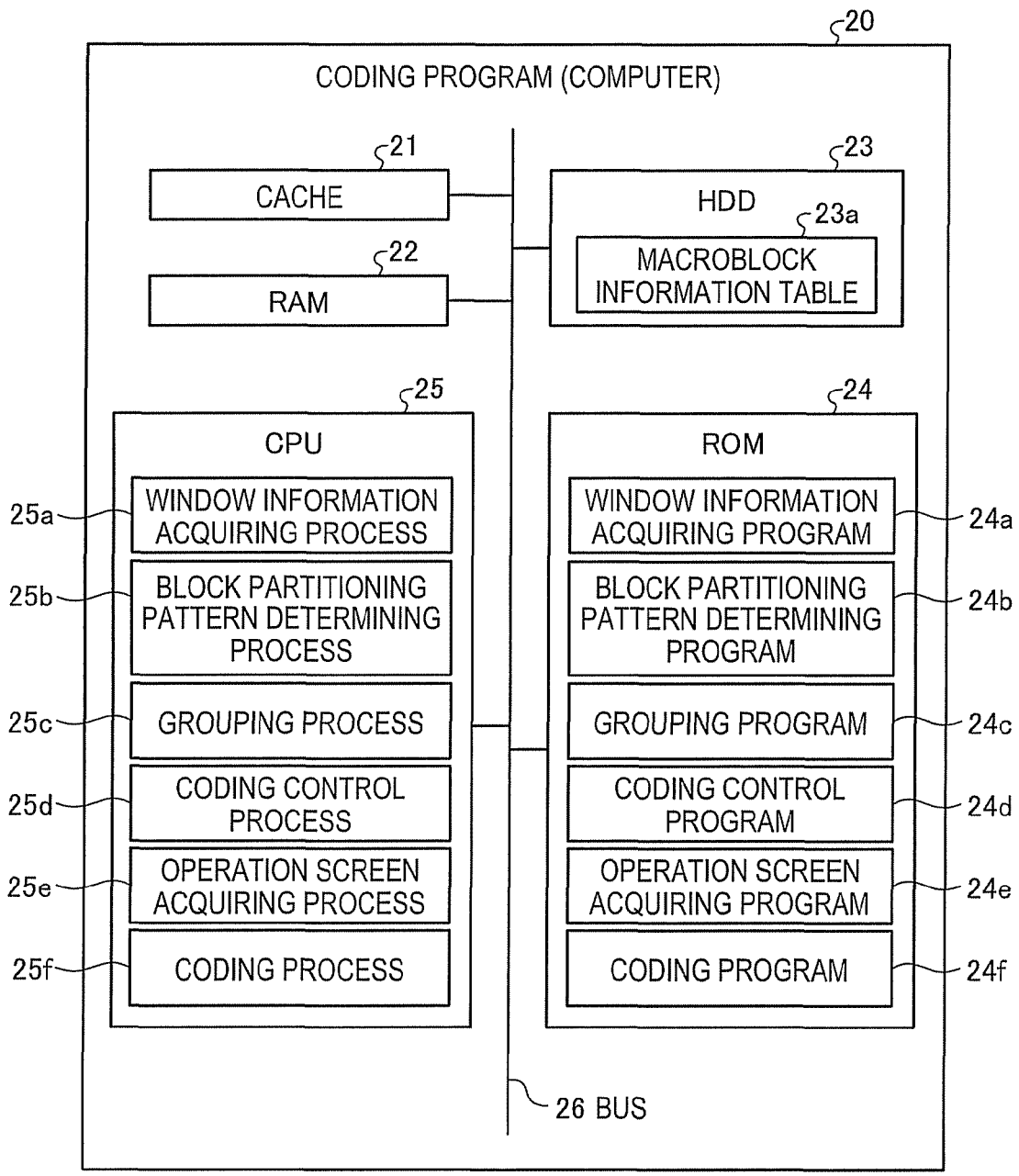
FIG. 10 is a diagram illustrating a computer executing a coding program.
Figure 11:
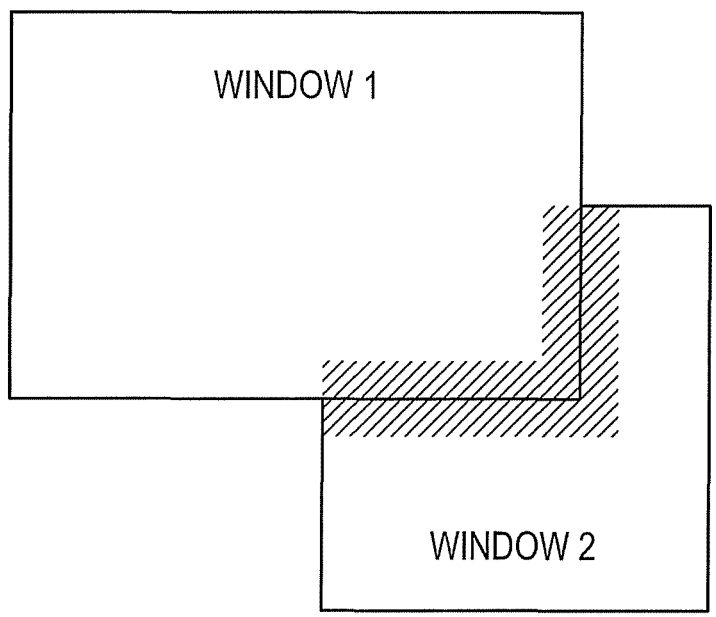
FIG. 11 is a diagram illustrating a conventional art.

Various kinds of processing described in the embodiments described above can be implemented by executing a program provided beforehand on a computer such as a personal computer or workstation. One example of such a computer that executes a coding program having the same functions as those of any of the embodiments described above will be described below with reference to FIG. 10. FIG. 10 shows a computer executing the coding program.

As shown in FIG. 10, the coding program (computer) 20 includes a cache 21, a RAM (Random Access Memory) 22, an HDD (Hard Disk Drive) 23, a ROM (Read Only Memory) 24, and a CPU 25 interconnected through a bus 26. The ROM 24 contains programs that fulfill the same functions as those of the embodiment described above: a window information acquiring program 24a, a block partitioning pattern determining program 24b, a grouping program 24c, a coding control program 24d, a operation screen acquiring program 24e, and a coding program 24f as shown in FIG. 10.

The CPU 25 reads and executes the programs 24a to 24f to cause the programs 24a to 24f to implement a window information acquiring process 25a, a block partitioning pattern determining process 25b, a grouping process 25c, a coding control process 25d, an operation screen acquiring process 25e, and a coding process 25f as shown in FIG. 10, respectively. The processes 25a to 25f correspond to the window information acquiring unit 12, the block partitioning pattern determining unit 14, the grouping unit 15, the coding control unit 16, the operation screen acquiring unit 17, and the coding unit 18, respectively.

As shown in FIG. 10, the HDD 23 contains a macroblock information table 23a. The macroblock information table 23a corresponds to the macroblock information storage 13 shown in FIG. 2.

The programs 24a to 24f given above do not necessarily need to be stored on the ROM 24. For example, the programs 24a to 24f may be stored on a portable physical medium that is inserted into the computer 20, such as a flexible disk (FD), CD-ROM, MO disk, DVD disk, magneto-optical disk, or IC card. Alternatively, the programs 24a to 24f may be stored on a fixed physical medium such as a hard disk drive (HDD) provided internally or externally to the computer 20, or may be stored on another computer (or a server) connected to the computer 20 through a link such as a public line, the Internet, a LAN (Local Area Network), or a WAN (Wide Area Network) and may be read and executed by the computer 20.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A coding apparatus, comprising:
   a window information acquiring unit acquiring window information indicating an arrangement of windows on a screen that includes a plurality of windows;
   an identifying unit identifying one or more macroblocks that include a border between overlapping windows from the window information and macroblock information indicating an arrangement of macroblocks into which the screen is partitioned;
   a classifying unit partitioning each of the identified one or more macroblocks into sub-blocks so as to conform to the border, the partitioning including at least a first partitioning pattern for macroblocks including a side portion of the border between overlapping windows, a second partitioning pattern for macroblocks including a top or bottom portion of the border between overlapping windows, and a third partitioning pattern for macroblocks including a corner portion of the border between overlapping windows, and classifying the sub-blocks into which the one or more macroblocks are partitioned into groups based on whether or not the sub-blocks include the border; and
   a coding unit coding the sub-blocks classified into the groups by performing motion vector prediction using a certain sub-block in a group for sub-blocks classified in the same group and applying a result of the motion vector prediction of the certain sub-block to the other sub-blocks classified in the same group as the certain sub-block.

2. The coding apparatus according to claim 1, wherein the window information includes a position and a size of each of the plurality of windows on the screen.

3. The coding apparatus according to claim 1, wherein the window information includes information indicating whether an overlapping window is in the foreground or behind a window.

4. A coding method, comprising:
   acquiring window information indicating an arrangement of windows on a screen that includes a plurality of windows;
   reading, from a storage device, macroblock information indicating an arrangement of macroblocks into which the screen is partitioned;
   identifying one or more macroblocks that include a border between overlapping windows based on the window information and the macroblock information;
   partitioning the identified one or more macroblocks that include the border between the overlapping windows into sub-blocks so as to conform to the border, the partitioning including at least a first partitioning pattern for macroblocks including a side portion of the border between overlapping windows, a second partitioning pattern for macroblocks including a top or bottom portion of the border between overlapping windows, and a third partitioning pattern for macroblocks including a corner portion of the border between overlapping windows;
   classifying the plurality of sub-blocks into which the one or more macroblocks are partitioned into groups based on whether or not the sub-blocks include the border; and
   coding the classified sub-blocks by performing motion vector prediction using a certain sub-block in a group for sub-blocks classified in the same group and applying a result of the motion vector prediction of the certain sub-block to the other sub-blocks classified in the same group as the certain sub-block.

5. The coding method according to claim 4, wherein the window information includes a position and a size of each of the plurality of windows on the screen.

6. The coding method according to claim 4, wherein the window information includes information indicating whether an overlapping window is in the foreground or behind a window.

7. A non-transitory computer-readable medium encoded with a computer program, the program when executed by a computer causes the computer to perform a coding method comprising:
   acquiring window information indicating an arrangement of windows on a screen that includes a plurality of windows;
   reading, from a storage device, macroblock information indicating an arrangement of macroblocks into which the screen is partitioned;
   identifying one or more macroblocks that include a border between overlapping windows based on the window information and the macroblock information;
   partitioning the identified one or more macroblocks that include the border between the overlapping windows into sub-blocks so as to conform to the border, the partitioning including at least a first partitioning pattern for macroblocks including a side portion of the border between overlapping windows, a second partitioning pattern for macroblocks including a top or bottom portion of the border between overlapping windows, and a third partitioning pattern for macroblocks including a corner portion of the border between overlapping windows;

classifying the plurality of sub-blocks into which the one or more macroblocks are partitioned into groups based on whether or not the sub-blocks include the border; and coding the classified sub-blocks by performing motion vector prediction using a certain sub-block in a group for sub-blocks classified in the same group and applying a result of the motion vector prediction of the certain sub-block to the other sub-blocks classified in the same group as the certain sub-block.

8. A coding apparatus comprising a processor; and a memory that stores a plurality of instructions, which when executed by the processor, cause the processor to execute:

acquiring window information indicating an arrangement of windows on a screen that includes a plurality of windows;

reading, from a storage device, macroblock information indicating an arrangement of macroblocks into which the screen is partitioned;

identifying one or more macroblocks that include a border between overlapping windows based on the window information and the macroblock information;

partitioning the identified one or more macroblocks that include the border between the overlapping windows into sub-blocks so as to conform to the border, the partitioning including at least a first partitioning pattern for macroblocks including a side portion of the border between overlapping windows, a second partitioning pattern for macroblocks including a top or bottom portion of the border between overlapping windows, and a third partitioning pattern for macroblocks including a corner portion of the border between overlapping windows;

classifying the plurality of sub-blocks into which the one or more the border;

coding the classified sub-blocks by performing motion vector prediction using a certain sub-block in a group for sub-blocks classified in the same group; and applying a result of the motion vector prediction of the certain sub-block to the other sub-blocks classified in the same group as the certain sub-block.

\* \* \* \* \*

UNITED STATES PATENT AND TRADEMARK OFFICE
CERTIFICATE OF CORRECTION

PATENT NO.         : 8,582,653 B2                                             Page 1 of 1
APPLICATION NO.    : 12/551983
DATED              : November 12, 2013
INVENTOR(S)        : Ichiki It is certified that error appears in the above-identified patent and that said Letters Patent is hereby corrected as shown below:

In the Claims

Column 14, Line 16, in Claim 8, after "more" insert -- macroblocks are partitioned into groups based on whether or not the sub-blocks include --, therefor.

Signed and Sealed this
Twenty-ninth Day of July, 2014

Michelle K. Lee
*Deputy Director of the United States Patent and Trademark Office*